May 5, 1936.  L. EMANUELI  2,039,587
FLUID FILLED ELECTRIC CABLE SYSTEM
Filed Nov. 18, 1933
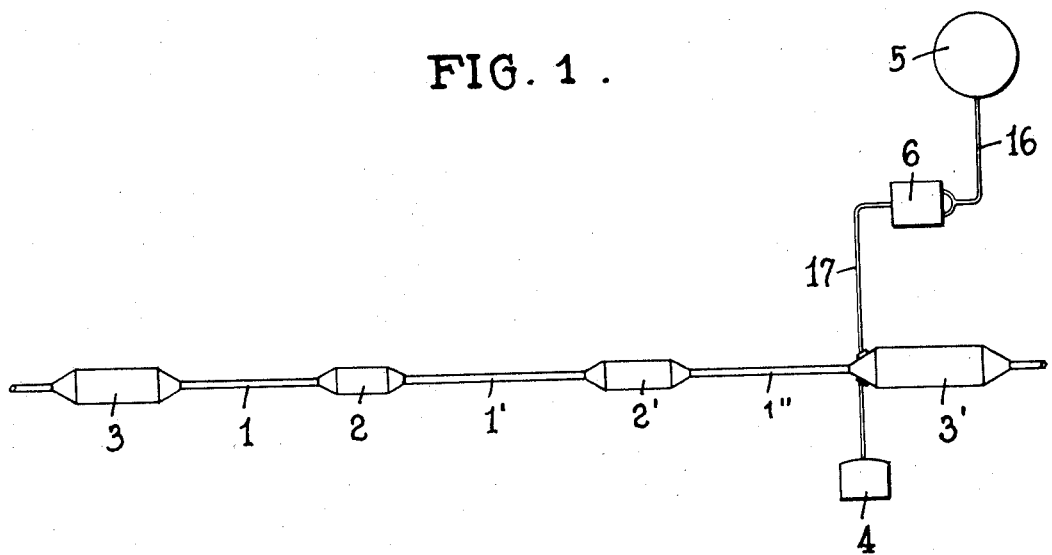
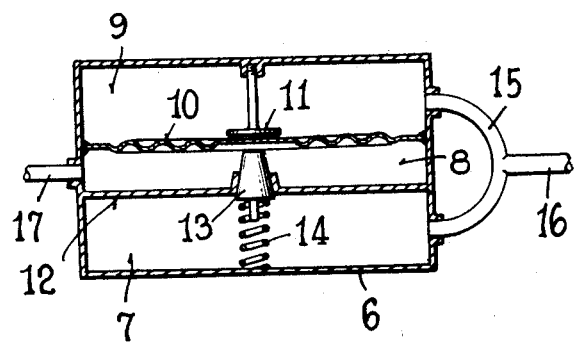
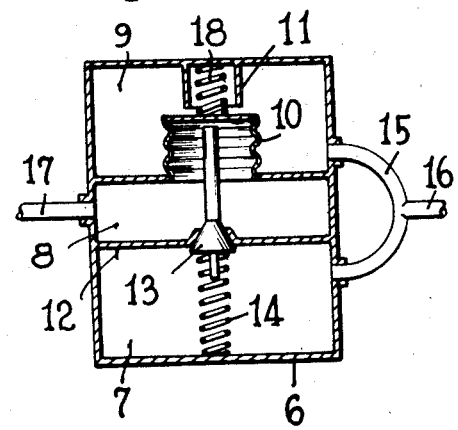
INVENTOR
LUIGI EMANUELI
BY Stone, Boyden & Mack,
ATTORNEYS Patented May 5, 1936

2,039,587

UNITED STATES PATENT OFFICE 2,039,587

FLUID FILLED ELECTRIC CABLE SYSTEM

Luigi Emanueli, Milan, Italy, assignor to Società Italiana Pirelli, a company of Italy Application November 18, 1933, Serial No. 698,714
In Italy December 3, 1932

8 Claims. (Cl. 173—264)

In fluid filled sheathed electric cable systems the cables are, as is well known, in permanent communication with closed reservoirs into which the fluid of the cable flows when the cable becomes hot, and from which the fluid flows back again into the cable when it becomes cold.

In a cable line, composed generally of two or more separate cables laid parallel, each cable is usually subdivided into sections separated by stop joints; as each section is connected with its own individual reservoir, it is supplied with insulating liquid independent of the others.

The reservors are generally of the type having collapsible cells which communicate with the interior of the cable and contain the insulating liquid at a pressure practically equal to that of the atmosphere, which cells can freely expand and contract within the atmosphere. Such reservoirs are called feeding tanks. When a cable section is fed with this type of reservoir, which must be installed at a certain height above the level of the cable, the liquid in it—at a given temperature—has a pressure determined only by the hydrostatic head due to the height of the reservoir, i. e., a constant pressure. The pressure in the cable varies only during the heating and cooling periods, but returns to the same value when a constant temperature is re-established.

There are also other well known types of reservoirs, constituted by a rigid walled casing filled with insulating liquid and communicating with the interior of the cable, in which casing are contained elastic expansible elements, as for instance, hermetically sealed collapsible cells filled with gas. These reservoirs are called pressure tanks. When a section of cabe is connected only to reservoirs of this type, which are usually installed underground in the joint manholes, the pressure in the cable—at any given constant outside temperature—varies according to the load on the cable, the volume of the expansible elements varying with the pressure.

Besides providing cable sections with feeding tanks only, that is with tanks operating under a constant pressure, and providing sections with pressure tanks only, that is with tanks operating under a pressure variable with the load, sections may be provided at the same time with a feeding tank at one end and a pressure tank at the other, this latter compensating for the variations of pressure in the cable during periods of changing temperatures. In this third system also, as in the first, the cable always has at any given temperature, a constant pressure, determined by the hydrostatic head of the liquid in the feeding reservoir.

In some cases, however, it is not possible, for practical reasons, to install the feeding tank high enough above the cable to give a sufficient hydrostatic head on the insulating liquid of the cable. It may happen that at the moment when the cable cools, the pressure is not great enough to compensate for the drop of pressure in the cable and the pipes carrying the fluid to it. In such cases, as there is during the first moments of cooling a heavy demand by the cable for fluid, it may happen that the low pressure formed in the cable gives rise, inside of it, to dangerous empty spaces or partial vacua, or even to the drawing in of air or moisture from the outside, at any point where the sheath is not perfectly tight.

This danger is eliminated by the new system which is hereinafter described and which forms the subject of the present invention.

In a cable installation constructed according to this system, a section of cable is connected, as in the third system mentioned above, to both a pressure reservoir and to a feeding reservoir, but in the present system the connection with the feeding reservoir is made through a regulating device having a valve which automatically controls the passage of the insulating fluid between the two reservoirs when a predetermined difference of pressure is reached, a greater difference, however, being necessary to cause the passage of fluid from the pressure to the feeding reservoir, than in the opposite direction.

In order that the invention may be better understood, reference is had to the accompanying drawing, in which Fig. 1 schematically represents a section of cable constructed according to the present invention, Fig. 2 shows, also schematically, and in section on an enlarged scale, the regulating device itself; and Fig. 3 is a view similar to Fig. 2, but showing a somewhat modified construction.

In Fig. 1 a certain number of lengths of cable 1, 1' and 1", connected together by intermediate joints (that is, not stop joints) 2 and 2', constitute a section of the cable system; it is terminated by stop joints 3 and 3' and is provided with a pressure reservoir 4 and a feeding reservoir 5, this latter, however, being connected to the cable through the regulating device 6.

The connection from the feeding and pressure reservoirs with the cable is generally effected at the ends of the section, that is at the stop joints, as such connections are not possible at the normal intermediate joints of the cable. There are, however, special types of intermediate joints which are known as feeding joints and which allow fluid to be introduced into the cable, and if such joints are adopted, the reservoirs can then be connected to the cable at the intermediate feeding joints instead of through the stop joints.

The regulating device 6, as shown in Fig. 2, comprises three contiguous chambers 7, 8 and 9, which are filled with the same insulating fluid as the cable. The chambers 8 and 9 are separated by a movable partition in the form of a flat elastic diaphragm 10, which moves in accordance with the difference of pressure betwen said two chambers. It is only possible for it, however, to move towards the chamber 8, movement toward the chamber 9 being prevented by a limiting stop 11. The chambers 7 and 8 are, on the contrary, separated by a rigid wall 12, which is provided with a port controlled by a check valve 13; this valve is arranged to open from the chamber 8 towards the chamber 7, and is pressed to its seat by a spring 14.

The outside chambers 7 and 9 communicate with each other through a connecting tube 15 to which a tube 16, extending to the feeding reservoir 5 is connected. On the other hand, the intermediate chamber 8 is, by means of a tube 17, connected with the cable at a suitable joint, and therefore also with the pressure reservoir, which is in permanent communication with the cable.

Under these conditions, when the pressure in the cable and in the pressure reservoir exceeds that of the feeding reservoir, that is, when the pressure in the chamber 8 is greater than that in chambers 7 and 9, the elastic diaphragm 10 is held fixed by the stop 11, and the valve 13 tends to be opened but the compression spring 14 does not allow it to open until the difference of pressure exceeds a certain predetermined value; in which case only, the fluid can flow from the cable and from the pressure tank to the feeding reservoir.

When, instead, the pressure in the chamber 8, i. e., that in the cable and in the pressure reservoir, is less than that in the chambers 7 and 9, i. e., that in the feeding reservoir, the diaphragm 10 presses against the end of the valve 13 and forces it open, establishing a passageway for the flow of fluid from the feeding tank to the cable and to the pressure tank. In this second case the difference of pressure necessary for the opening of the valve may be, owing to the construction of the apparatus and the adjustment of the spring 14, much less than in the preceding case. This is due to the relatively large area of the diaphragm 10, which, in any case, should be more than double the area of the seat of the valve 13.

In many cases it may be useful that the partition such as 10 be always lightly pressed by an adjustable spring such as 18 towards the valve, as shown in Fig. 3. This spring operates only when the pressure in the feeding tank is greater than that in the pressure tank, and is inactive in the opposite case. Another difference in the regulating device of Fig. 3 is that the partition is carried by an elastic diaphragm which has the form of a cylinder instead of being flat.

In the new system described, the pressure in the cable is no longer constantly equal to that determined by the height of the feeding reservoir but, by means of the regulating device mentioned above, a greater pressure, by a desired amount, than that corresponding to the hydrostatic head of the liquid in said reservoir is obtained inside the cable. Therefore, during the cooling period of the cable, at the moment of the greatest demand for fluid, there exists, in the cable and the pressure tank, a pressure and quantity of fluid sufficient to satisfy the demand, thus avoiding the formation in the interior of the cable of dangerous voids and regions of low pressure such as might result from the insufficient hydrostatic head of the liquid in the feeding tank.

It will be further observed that, by virtue of the arrangement above described, during heating up of the cable due to load, the insulating liquid is expelled and collects first in the pressure tank, where its pressure may exceed that corresponding to the hydrostatic head of the liquid in the feeding tank. Subsequently, the valve 13 is forced open, and liquid then backs up in the feeding tank. Similarly, when the cable cools, liquid will first be fed to it from the pressure tank, until the pressure falls to a predetermined point, and then afterwards, as cooling continues, from both tanks.

It is also important to notice that the regulating device, being hermetically closed and not communicating with the outside medium, is in no way influenced by the atmospheric pressure and would operate just the same even if it were immersed in water and under any external pressure whatever.

What I claim is:

1. In a fluid filled electric cable system, the combination with a cable section, of a feeding reservoir and a pressure reservoir connected therewith, the connection between said pressure reservoir and cable being constantly open and a regulating device interposed in the connection between said feeding reservoir and the cable and having a single normally closed valve controlling the passage of fluid therethrough in both directions, said device comprising means responsive to a predetermined difference in pressure for opening said valve.

2. In a fluid filled electric cable system, the combination with a cable section, of a feeding reservoir connected therewith, and a regulating device interposed in the connection between said feeding reservoir and the cable and having a single normally closed valve controlling the passage of fluid therethrough in both directions, said device comprising means for causing said valve to open when the pressure in the cable exceeds that in the reservoir by a given amount, and means including an elastic diaphragm for also opening said valve when the pressure in the reservoir exceeds that in the cable.

3. In a fluid filled electric cable system, the combination with a cable section, of a feeding reservoir connected therewith, and a regulating device interposed in the connection between said feeding reservoir and the cable and having a single normally closed valve controlling the passage of fluid therethrough in both directions, said device comprising means for causing said valve to open when the pressure in the cable exceeds that in the reservoir by a given amount, and means including an elastic diaphragm for also opening said valve when the pressure in the reservoir exceeds that in the cable by a smaller amount.

4. In a fluid filled electric cable system, the combination with a cable section, of a feeding reservoir connected therewith, and a regulating device interposed in the connection between said reservoir and the cable and comprising a casing divided into an intermediate and two outer chambers, said intermediate chamber communicating with the cable and said outer chambers communicating with each other and with said reservoir, a single spring-pressed valve controlling communication between said intermediate chamber and one of said outer chambers and opening towards the latter, and a flexible diaphragm separating said intermediate chamber from the other outer chamber and serving to engage and unseat said valve whenever the pressure in the latter exceeds that in the former by a predetermined amount.

5. In a fluid filled electric cable system, the combination with a cable section, of a feeding reservoir and pressure reservoir both connected therewith, and means interposed in the connections for permitting the flow of fluid from said feeding reservoir to said pressure reservoir only when the difference in pressure between the two reservoirs reaches a given value, and for permitting the flow of fluid in the opposite direction only when the difference in pressure reaches a greater value.

6. In a fluid filled electric cable system, the combination with a cable section, of a feeding reservoir and pressure reservoir both connected with the same end thereof, and valve means interposed in the connections between said feeding reservoir and cable whereby, during heating up of the cable, the liquid expelled collects first in the pressure tank until the pressure exceeds by a predetermined amount that due to the hydrostatic head in the feeding tank, and then afterwards flows into said feeding tank.

7. In a fluid filled electric cable system, the combination with a cable section, of a feeding reservoir and pressure reservoir both connected with the same end thereof, and means interposed in the connections whereby, during heating up of the cable, the liquid expelled collects first in the pressure tank until the pressure exceeds by a predetermined amount that due to the hydrostatic head in the feeding tank, and then afterwards flows into said feeding tank and, during cooling of the cable, the liquid flows first out of said pressure tank and then out of both tanks.

8. In a fluid filled electric cable system, the combination with a cable section, of a feeding reservoir connected therewith, and a regulating device interposed in the connection between said reservoir and the cable and comprising a casing divided into an intermediate and two outer chambers, said intermediate chamber communicating with the cable and said outer chambers communicating with each other and with said reservoir, a single spring-pressed valve controlling communication between said intermediate chamber and one of said outer chambers and opening towards the latter, and a movable partition wall interposed between said intermediate chamber and the other outer chamber, and serving to mechanically unseat said valve whenever the pressure in the latter exceeds that in the former by a predetermined amount.

LUIGI EMANUELI.